(12) United States Patent
Hughes (10) Patent No.: US 11,371,750 B2
(45) Date of Patent: *Jun. 28, 2022

(54) WIFI AND CLOUD ENABLED TEMPERATURE CONTROL SYSTEM

(71) Applicant: Avralis, LLC, Atlanta, GA (US)

(72) Inventor: Branden Lamar Hughes, Atlanta, GA (US)

(73) Assignee: Avralis, LLC, Atlanta, GA (US)

( * ) Notice: Subject to any disclaimer, the term of this patent is extended or adjusted under 35 U.S.C. 154(b) by 163 days.

This patent is subject to a terminal disclaimer.

(21) Appl. No.: 16/700,597

(22) Filed: Dec. 2, 2019

(65) Prior Publication Data

US 2020/0191439 A1 Jun. 18, 2020

Related U.S. Application Data

(63) Continuation of application No. 15/704,362, filed on Nov. 13, 2017, now Pat. No. 10,495,346.

(51) Int. Cl.
*F24H 9/20* (2022.01)
*G05D 23/19* (2006.01)

(52) U.S. Cl.
CPC ......... *F24H 9/2007* (2013.01); *F24H 9/2021* (2013.01); *G05D 23/1919* (2013.01)

(58) Field of Classification Search
USPC .......................................... 700/300; 122/13
See application file for complete search history.

(56) References Cited

U.S. PATENT DOCUMENTS

| | | | | |
|---|---|---|---|---|
| 8,467,910 | B1* | 6/2013 | Kumar | G05D 23/1931 700/291 |
| 8,550,369 | B2* | 10/2013 | Subramanian | F24H 9/2007 236/20 R |
| 9,195,242 | B2* | 11/2015 | Zobrist | F24D 19/1051 |
| 9,390,381 | B2 | 7/2016 | Davari et al. | |
| 2005/0268865 | A1 | 12/2005 | Valbh et al. | |
| 2010/0187219 | A1* | 7/2010 | Besore | H02J 3/14 219/494 |
| 2014/0156087 | A1 | 6/2014 | Amundson | |
| 2016/0187004 | A1 | 6/2016 | Wheelwright | |
| 2019/0145660 | A1 | 5/2019 | Hughes | |
| 2019/0331363 | A1* | 10/2019 | Peng | F24H 9/2007 |

* cited by examiner

*Primary Examiner* — Md Azad
(74) *Attorney, Agent, or Firm* — Bekiares Eliezer LLP (57) ABSTRACT

Disclosed herein are WIFI and could enabled temperature control systems. The temperature control systems are configured to receive user temperature settings and preferences, and control a water heater based on the user temperature settings and preferences. The temperature control systems include two or more sampling rates for enabling a higher efficiency of operation compared to conventional water heaters.

20 Claims, 5 Drawing Sheets

WIFI AND CLOUD ENABLED TEMPERATURE CONTROL SYSTEM

CROSS-REFERENCE TO RELATED APPLICATION

This application is a continuation of U.S. application Ser. No. 15/704,362, filed Nov. 13, 2017, entitled "WIFI AND CLOUD ENABLED TEMPERATURE CONTROL SYSTEM", which is incorporated herein by reference.

BACKGROUND OF THE INVENTION

Typical storage water heaters (e.g., water heaters with water storage tanks) maintain a water temperature at a fixed setting throughout the day. Most homeowners, building or business owners, or other people in the general public can be unaware that the setting of the storage water heater can be changed or can be discouraged from trying to manipulate the setting without the aid of a professional due to various characteristics of the storage water heater such as where they are typically located within a building, the structure of the storage water heater itself, and the amount of energy that the water heater consumes. As such, water heaters typically run at the same, unchanged setting, which is one reason why storage water heaters have a high energy consumption and are one of the costliest appliances for a homeowner to run.

SUMMARY OF THE INVENTION

In accordance with the purposes of the invention, as embodied and broadly described herein, the invention, in one aspect, relates to a WIFI and cloud enabled temperature control system.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The features and components of the following figures are illustrated to emphasize the general principles of the present disclosure. The corresponding features and components throughout the figures can be designated by matching reference characters for the sake of consistency and clarity.

DETAILED DESCRIPTION OF THE INVENTION

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Any and all publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this invention belongs. In this specification and in the claims, which follow, reference will be made to a number of terms which shall be defined herein.

As used in the specification and the appended claims, the singular forms "a," "an" and "the" include plural referents unless the context clearly dictates otherwise. Thus, for example, reference to "an assembly" includes two or more assemblies.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Disclosed are the components to be used to manufacture the disclosed devices and articles of the invention as well as the materials themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Temperature Control Systems

As briefly described above, the present disclosure relates, in various aspects, to WIFI and cloud enabled temperature control systems.

Most North American water heaters have traditionally been tank-type water heaters, which are also known as storage water heaters. Storage water heaters typically come in sizes from about 20 to 100 gallons and can be designated for commercial or residential use.

Figure 1A:
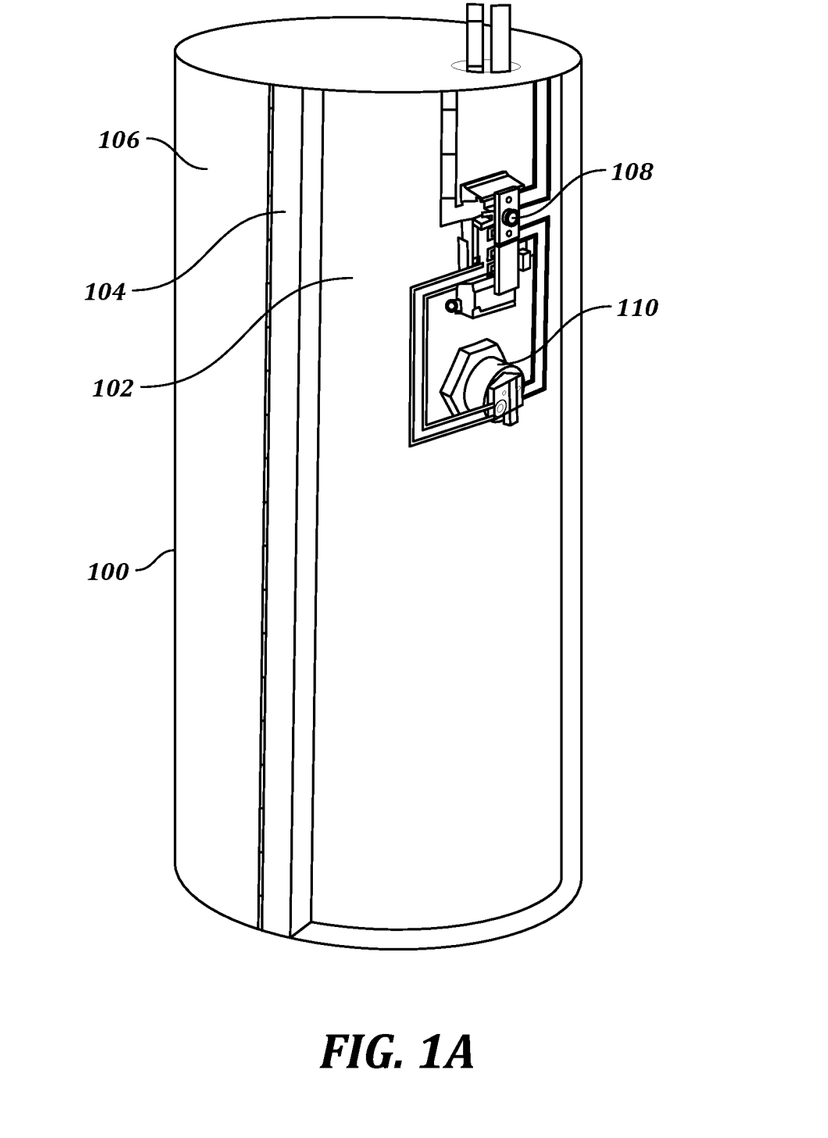
FIG. 1A shows a water heater system including a water tank and a temperature control system in accordance with aspects of the current disclosure.

FIG. 1A shows an example of a standard storage water heater 100. As shown in FIG. 1A, the storage water heater 100 generally includes a steel tank 102, which is configured to hold water to be heated, a metal shell 106, and foam insulation 104 between the steel tank 102 and the metal shell 106. The standard storage water heater 100 generally includes at least one thermostat 108 and at least one heat source 110. The heat source 110 can be electric heating elements, oil, propane, natural gas, oil, solar, or various other sources for heating water. The storage water heater 100 is configured to continuously keep water hot and ready for use.

Figure 1B:
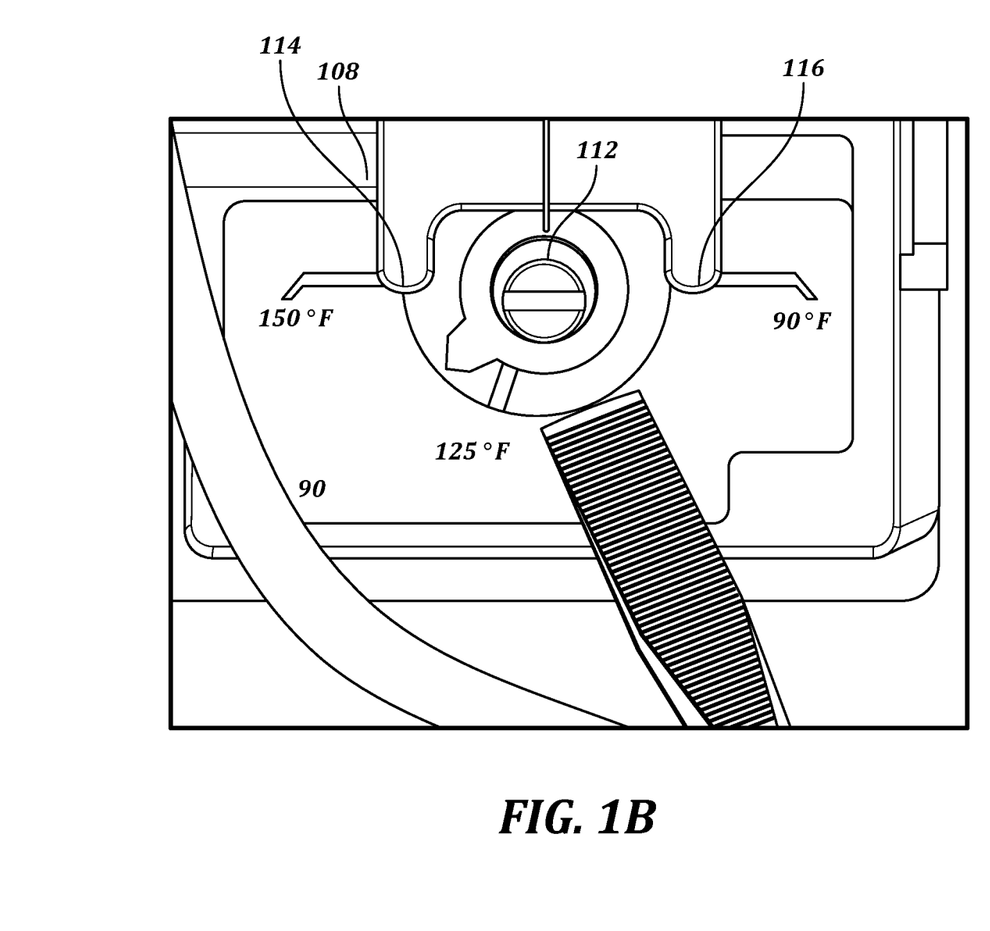
FIG. 1B shows a detailed view of a thermostat of the temperature control system of FIG. 1A.

FIG. 1B shows a detailed view of a portion of a standard thermostat 108 of the storage water heater 100. As shown in FIG. 1B, the standard thermostat 108 generally includes a thermostat setting 112, which is used to set a temperature at which the water in the storage water heater 100 will be heated. The thermostat setting 112 may be moved between a predefined maximum temperature setting 114 (about 150-180 degrees) and minimum temperature setting 116 (about 90-120 degrees). The maximum temperature setting 114 and minimum temperature setting 116 are predefined by the manufacturer of the storage water heater 100 and cannot be changed by a user changing the thermostat setting 112. The thermostat 108 in a residential setting typically has a maximum temperature setting 114 of about 150 degrees Fahrenheit. The thermostat 108 may also have a residential minimum temperature setting 116 of about 90 degrees Fahrenheit. The thermostat setting 112 is also capable of being set to temperatures in between the maximum and minimum settings. The thermostat 108 in a commercial setting typically has a maximum temperature setting 114 of about 180 degrees Fahrenheit and a minimum temperature setting 116 of about 120 degrees Fahrenheit. To set or adjust the temperature setting 112, the user must manually adjust the thermostat setting 112. The thermostat setting 112 in turn adjusts the water temperature threshold of which the heat source 110 is powered-on to heat the water. The thermostat 108 acts as a relay, powering off the heat source 110 when the water temperature is above the temperature setting 112, and powering on the heat source 110 when the water temperature is below the temperature setting 112.

Because it takes a great deal of energy to heat water, and because the energy efficiency of storage water tanks can widely vary, the energy consumption of storage water heaters is high relative to other appliances. Moreover, adjusting the thermostat setting 112 typically involves removing a portion of the metal shell 106 (such as a protective cover) and removing a portion of the insulation 104 to access the thermostat 108, and then manually adjusting the thermostat setting 112; which is a task that many average users that have no knowledge of water heaters may not want to undertake. Although some manufacturers have developed some energy efficient models of storage water heaters, these water heaters are generally not compatible with other models or manufacturers. Moreover, use of these typically requires a homeowner or building owner to remove the entire old storage water heater and install the new water heater, which can be a costly endeavor.

Figure 2:
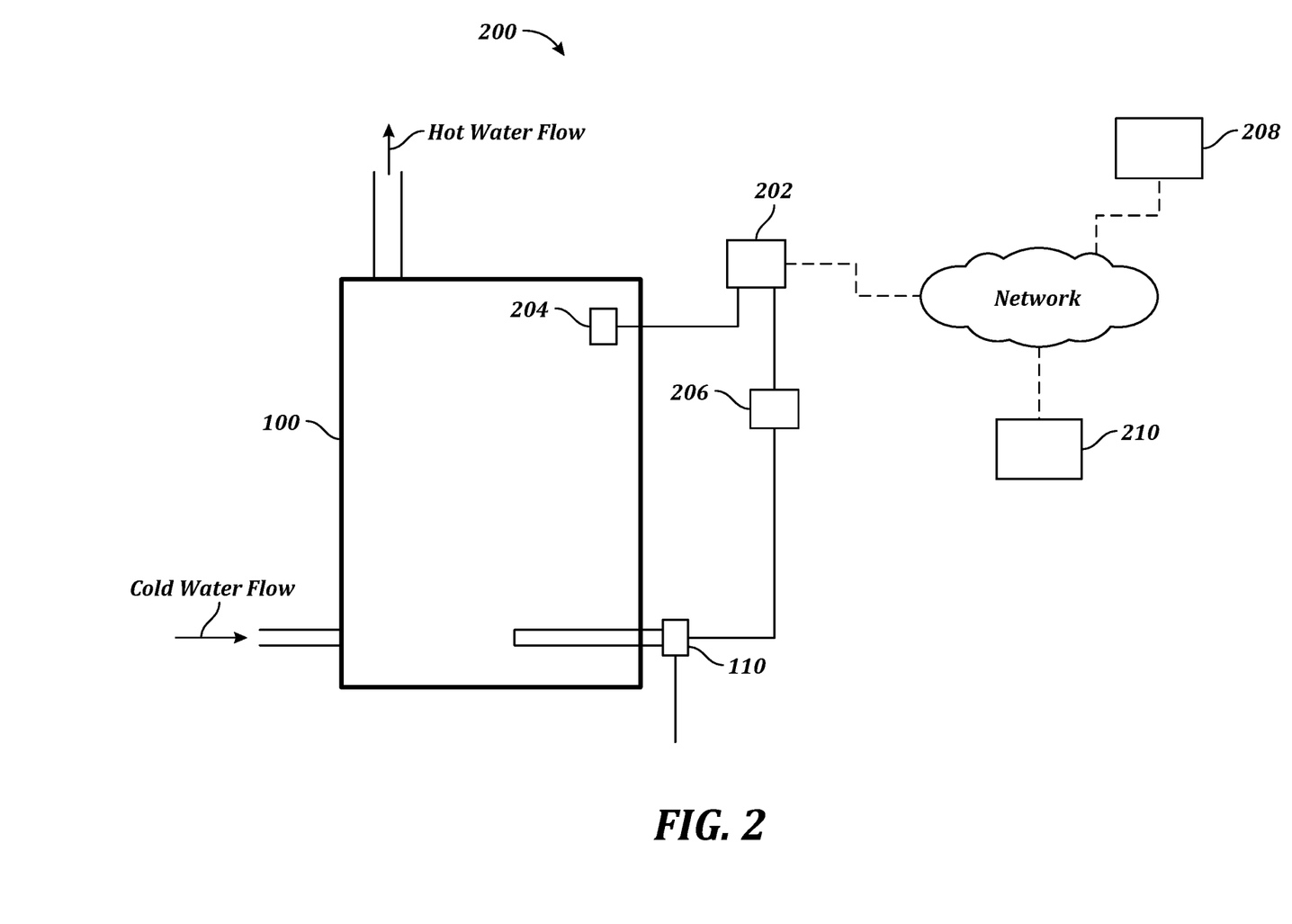
FIG. 2 is a schematic of the temperature control system of FIG. 1A.

Referring to FIG. 2, in view of the aforementioned problems, in one aspect, disclosed is a temperature control system 200 and associated methods, systems, devices, and various apparatuses. The temperature control system 200 is configured for monitoring, controlling, and communicating a water temperature. In one aspect, the temperature control system 200 comprises a controller 202, a temperature probe 204, and a relay 206. It would be understood by one of ordinary skill in the art that the disclosed temperature control system 200 is described in but a few exemplary aspects among many. It is contemplated that the temperature control system 200 can be utilized with the storage water heater 100. However, one having skill in the art will appreciate that the temperature control system 200 can be utilized with various other systems where control of a temperature is desirable, including, but not limited to, incubators, home brewing systems, aquatic aquariums, terrestrial aquariums, and various other systems.

The controller 202 can be in communication with the temperature probe 204 and the relay 206. The controller 202 can also be in communication with a server 210 and a user device 208. The relay 206 can be in communication with the heat source 108, as described in greater detail below. Communications can occur through various communications networks known in the art, including but not limited to wired networks, wireless networks, Bluetooth networks, WIFI networks, RF networks, local area networks (LAN), internet networks, wide area networks (WAN), etc.

The temperature probe 204 is configured to measure the temperature of water within the water heater. The relay 206 is configured to selectively switch between an "on" status and an "off" status. In the on status, the relay 206 activates the heating source 110 such that the heating source 110 heats the water within the water heater 100. In the off status, the relay 206 deactivates the heating source 110 such that the heating source 110 does not heat the water within the water heater 100. As described in greater detail below, the status of the relay 206 is controlled by the controller 202.

The user device 208 can be utilized to receive information to control the water heater 100 from a user. For example, and without limitation, the user device 208 can receive a water temperature minimum, a water temperature maximum, an instant on or off of the heating element 110, an away temperature minimum, an away temperature maximum, a sampling rate (rate at which the system 200 probes for data), etc. In other aspects, the user device 208 can display to the user the current water temperature, relay status, energy usage, energy usage cost, predicted energy cost, and various other information. In some aspects, the user device 208 can display real time information pertaining to the system 200 such as water temperature, relay status, energy usage, energy usage cost, etc. In other aspects, the user device 208 can display historical information pertaining to the system 200. The server 210 can be configured to store the various information received from the user device 208. In another aspect, the server 210 can be configured to store the water temperature as measured by the temperature probe 204 and the status of the relay 206 for a predetermined amount of time.

Figure 3:
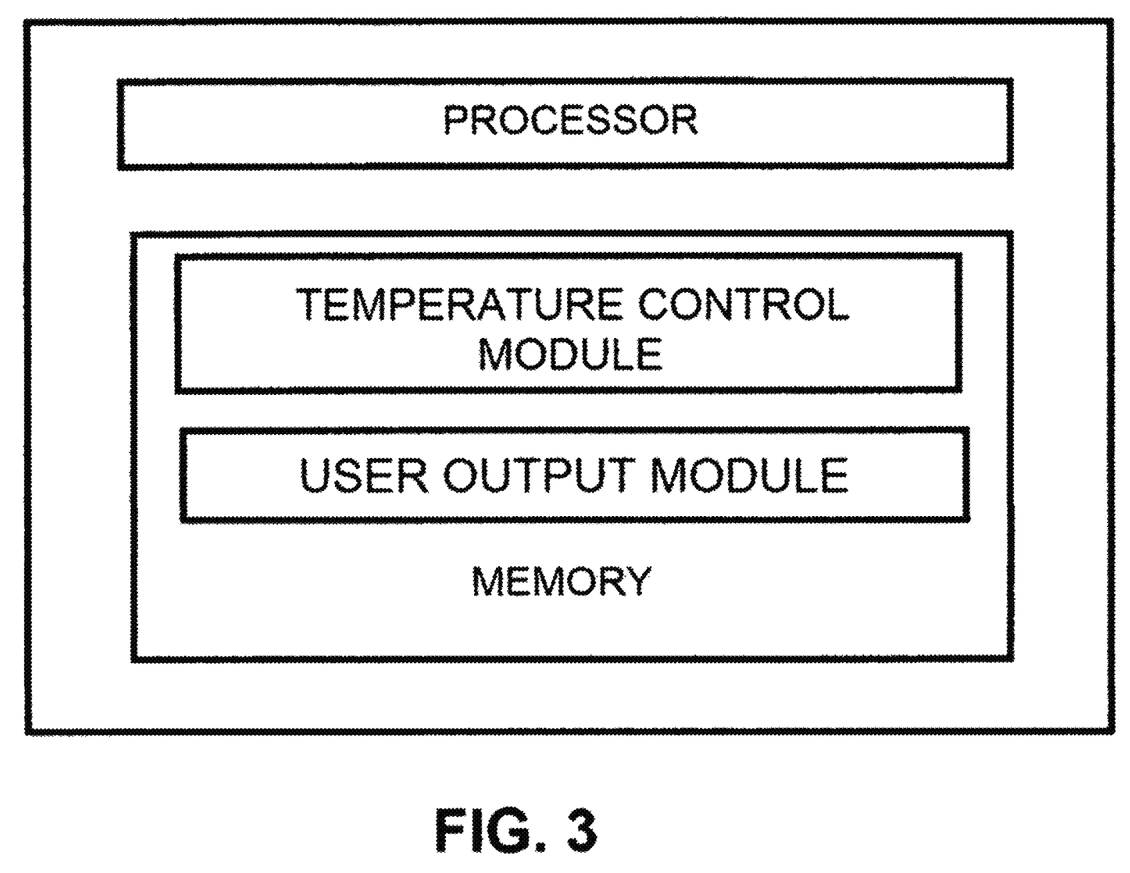
FIG. 3 is a schematic of the temperature control system of FIG. 1B.

Referring to FIG. 3, the controller 202 can comprise a processor and a memory. The processor is configured for sending and receiving data from the various components of the system 200. In some examples, the memory can hold a predetermined amount of data. For example, the memory can hold data for a predetermined amount of time (e.g. one day, one week, one month), can hold a predetermined number of readings (e.g. 10 temperature readings, 100 temperature readings, 1000 temperature readings, or more), or other data. Additionally, the memory can hold computer-executable instructions for the processor to execute. Referring to FIG. 3, in some aspects, the memory can comprise instructions for a temperature control module. The memory can also comprise instructions for a user output module.

Figure 4:
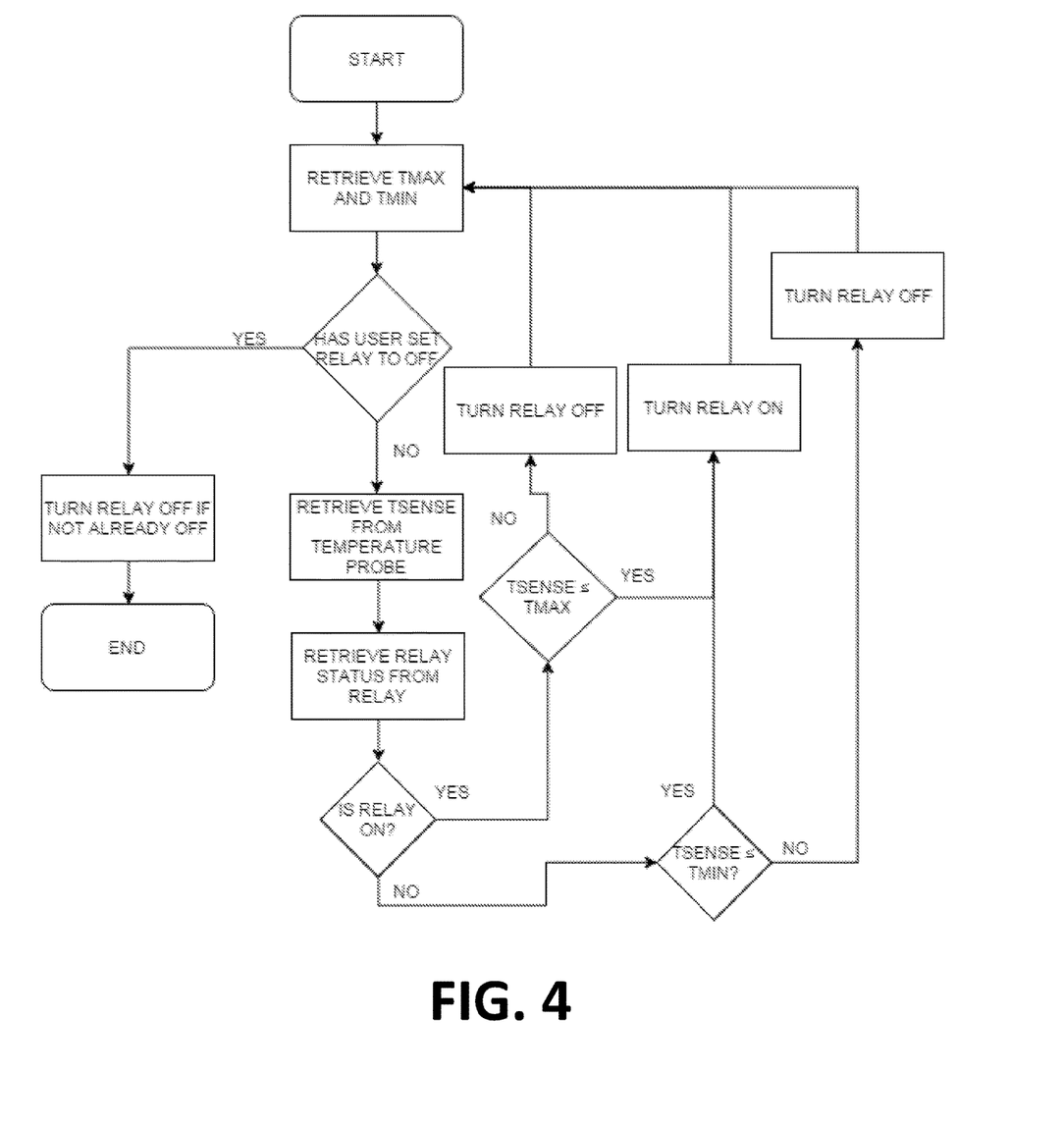
FIG. 4 is a flow chart of a method of controlling a temperature with the temperature control system of FIG. 3.

Referring to FIG. 4, an example method of controlling the water temperature of the water heater 100 via the temperature control module is disclosed. In one aspect, the method comprises receiving the water temperature maximum and the water temperature minimum from the user. In some aspects, controller 202 receives the water temperature maximum and minimum from the user device 208. In other aspects, the controller 202 receives the water temperature maximum and minimum from the server 210, which may store the water temperature maximum and minimum, as well as other data.

In some aspects, the controller receives the water temperature maximum and the water temperature minimum at predefined sampling rates. The predefined sampling rates can be preinstalled into the controller as a default setting or can be set by the user via the user device. For example, and without limitation, in some aspects, the controller can sample at a rate of 1-10 seconds (high rate), 30-60 seconds (medium rate), 5-15 minutes (low rate), 4-24 hours (e.g., a sleep rate where the controller enters a low power state and only periodically "wakes up" to collect data).

The method further comprises determining whether the user has set the relay to off via the user device. If the user has set the relay to off, the controller sends a signal to the relay to turn the relay off if the relay is not already off, and the process ends.

If the user has not set the relay to an off status, the controller retrieves the sensed temperature of the water (TSENSE) from the temperature probe. In some aspects, TSENSE is retrieved at the sampling rate. In another aspect, the controller retrieves the relay status from the relay. As previously described, the relay can have two statuses—an "on" status where the relay enables the heating element to heat the water in the water heater, and an "off" status where the relay prevents the heating element from turning on to heat the water in the water heater.

In some aspects, the method comprises determining if the relay is at the "on" status. In some aspects, the controller can retrieve the relay status from the relay. In other aspects, the relay sends the relay status to the controller. If the relay status is on, the controller determines whether TSENSE is less than or equal to TMAX. If the controller determines that TSENSE is greater than TMAX, the controller sends a signal to turn the relay to be in the off configuration. In this aspect, after the controller turns the relay off, the controller retrieves the TMAX and TMIN from the user device and determines whether TMAX and TMIN have changed from the previous reading.

If the controller determines that TSENSE is less than or equal to TMAX, the controller sends a signal to the relay to turn the relay to "on". After turning the relay on, the controller retrieves the TMAX and TMIN from the user device and determines whether TMAX and TMIN have changed from the previous reading.

If the controller determines that the relay is not on, the controller determines whether TSENSE is less than or equal to TMIN. If TSENSE is less than or equal to TMIN, the controller turns the relay on such that the heating element can heat the water in the water heater, and then the controller retrieves the TMAX and TMIN from the user device and determines whether TMAX and TMIN have changed from the previous reading.

If TSENSE is greater than TMIN, the controller turns the relay off, and then retrieves the TMAX and TMIN from the user device and determines whether TMAX and TMIN have changed from the previous reading. The process continues until the controller determines that the user has turned the relay off, as described above.

Process Steps and Features:
Retrieves user input from the cloud (server 210)
Temperature setting to start heating
Temperature setting to stop heating
Instant off/on
Away mode minimum setting to let temperature fall to
Away mode maximum setting to let temperature heat to
Sample rate (A speed at which the device probes for data, and collects user data from the cloud): High (1-10 seconds), Medium (30-60 seconds), Low (5-15 minutes), deep sleep (extremely low power mode setting on chip, wakes up only every 4-24 hours for collection cycles)
LED lights on or off (will usually sit inside of a closet, so 99% of the time lighting LEDs is a waste of power, albeit a very tiny one).
Reads temperature probe at X frequency, where X is the sample rate.
Reads status of relay (on/off) at X frequency, where X is the sample rate
Sets status of element/relay on
if element/relay is off, and temperature probe data is less than (<) temperature setting to start heating (or away mode min)
Sets status of element/relay off
if element/relay is on, and temperature probe data is greater than (>) temperature setting to stop heating (or away mode max).
Updates data (temperature, relay status) back to user device 208
Controls heating element as compared to user's threshold settings
UI/app based configurable user settings
kWh cost
Element wattage
For tracking real time energy usage (when combined with element/relay state)
Stored in historical roll-up metrics to monitor and graph over time
Benefits
Configurable range of heating
Traditional water thermostats have a fixed setting
Set temp to lower than 90 degrees, control temps above 180 degrees
Standard temperature controls limited to 90-150 (residential) or 120-180 (commercial)
Away mode
Configurable with calendar/scheduler
Configurable with geo-fencing (GPS range)
Instant On/Off
Sanitization mode
Heat water to 150 or above for a specific period of time
Clean tank after sitting unheated for extended period
Provide an extra hot dishwasher/clothes washing cycle
Child safety mode
Set to 100 F or below for specific time periods
Prevent pipes from freezing, while still minimizing heating cost
Away mode min, which can be set lower than 90 F, but not allow it below freezing
Real time energy monitoring (cost, wattage, etc.)
Track how much money spent/energy used or consumed over a time period
Can be compared with the national average, as well as other users
Possible use-cases
Electric water heater
Incubator
Home brew or brewery system
Aquatic aquariums
Lighting/pumps/control system (temperature probe is waterproof)
Terrestrial aquariums
Heat lamps
Any application where smart control of device based on temperature is desirable
Learning mode/Smart scheduling
By tracking data over time, can estimate how long it will take to for water heater temperature to go from a low to an ideal setting
Using historic data, can create a perfect or good schedule, only heating as needed for a user's lifestyle
Using geo-fencing, can also heat to ideal temperature as user crosses geographical "fence" of proximity to the home
User controlled schedule
Setting specific time intervals to operate, based on user input of their schedule
Password protection
Can be locked for renters or guests
Tamper prevention
Removes mechanical connection, prevents adjustment from anyone who has access appliance While certain embodiments of the disclosure have been described, other embodiments may exist. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the descriptions included herein, and grants permission to reproduce the material only in connection with reproduction of the granted patent and for no other purpose.

C. Aspects

The present invention includes at least the following aspects:

Aspect 1: A digital temperature control system comprising: a first means for reading a measurement captured by a temperature sensor configured to measure a temperature of a fluid in a container; a second means for operating a relay to determine and control a state of a heating source configured to affect the temperature of the fluid in the container; a communications module for bi-directionally communicating data with a remote network; a processor for processing data; and a controller configured to operate the processor, the first means, the second means, and the communications module, the controller being configured to: receive a user input defining at least one of a first temperature threshold, a second temperature threshold, a first sample rate for operating the first means to retrieve the measurement captured by the temperature sensor, and a second sample rate for operating the second means to determine and control a state of the heating source; receive, via the first means, the measurement captured by the temperature sensor in accordance to the first sample rate; determine, via the second means, the state of the heating source; turn the heating source on when the heating source is off and the measurement is below the first temperature threshold; turn the heating source off when the heating source is on and the measurement is above the second temperature threshold; aggregate data associated with the container of the fluid and operation of the digital temperature control means, the aggregated data indicative of power consumption associated with the container of the fluid, the energy usage comprising real-time usage data and historical usage data, and costs associated with the power consumption; predict future power consumption and costs associated with the container of the fluid; and adjust, based on predicted future power consumption and costs, the first temperature threshold and the second temperature threshold; wherein the container of the fluid has no built-in communications module for communicating with the remote network.

Aspect 2: The digital temperature control system of any preceding aspect, wherein predicting the future power consumption and costs comprises: employing the usage analytics; and employing at least one environmental factor based on a location of the container of the fluid, and times of operation of the heating source.

Aspect 3: The digital temperature control system of any preceding aspect, wherein the container is a water heating tank and the fluid is water.

Aspect 4: The digital temperature control system of any preceding aspect, wherein the heating source is an electrical heating element.

Aspect 5: The digital temperature control system of any preceding aspect, wherein the heating source is a natural gas heating element, a solar heating element, a propane heating element, or an oil heating element.

Aspect 6: The digital temperature control system of any preceding aspect, wherein the temperature sensor is configured to provide an electrical signal indicative of the temperature of the fluid.

Aspect 7: The digital temperature control system of any preceding aspect, further comprising a user device in operative communication with the controller over the remote network.

Aspect 8: The digital temperature control system of any preceding aspect, wherein the first sample rate is at least one of one or more seconds, one or more minutes, and one or more hours.

Aspect 9: The digital temperature control system of any preceding aspect, wherein the second sample rate is at least one of one or more seconds, one or more minutes, and one or more hours.

Aspect 10: The digital temperature control system of any preceding aspect, wherein the remote network is a wireless network.

Aspect 11: The digital temperature control system of any preceding aspect, wherein the first temperature threshold is greater than or equal to ninety degrees Fahrenheit.

Aspect 12: The digital temperature control system of any preceding aspect, wherein the second temperature threshold is greater than or equal to one hundred fifty degrees Fahrenheit.

Aspect 13: A method comprising: integrating a container of a fluid with a digital temperature control means, the digital temperature control means comprising: a first means for reading a measurement captured by a temperature sensor configured to measure a temperature of the fluid in the container, a second means for operating a relay to determine and control a state of a heating source configured to affect the temperature of the fluid in the container, a communications module for bi-directionally communicating data with a remote network, a processor for processing data, and a controller configured to operate the processor, the first means, the second means, and the communications module; receiving a user input comprising at least one of the following: a first temperature threshold, a second temperature threshold, a first sample rate for operating the first means to retrieve the measurement captured by the temperature sensor, and a second sample rate for operating the second means to determine and control a state of the heating source; receiving, via the first means, the measurement captured by the temperature sensor in accordance to the first sample rate; determining, via the second means, the state of the heating source; controlling, via the second means, the state of the heating source, wherein controlling the state of the heating source comprises: turning the heating source on when the heating source is off and the measurement is below the first temperature threshold, and turning the heating source off when the heating source is on and the measurement is above the second temperature threshold; aggregating data associated with the container of the fluid and operation of the digital temperature control means; calculating usage analytics, the usage analytics comprising: power consumption associated with the container of the fluid, the energy usage comprising real-time usage data and historical usage data, and costs associated with the power consumption; predicting future power consumption and costs associated with the container of the fluid; and adjusting, based on predicted future power consumption and costs the first temperature threshold and the second temperature threshold, wherein integrating the container of the fluid with the digital temperature control means comprises integrating the container of the fluid that has no built-in communications module for communicating with the remote network.

Aspect 14: The method of any preceding aspect, wherein predicting the future power consumption and costs comprises: employing the usage analytics; and employing at least one environmental factor based on a location of the container of the fluid, and times of operation of the heating source.

Aspect 15: The method of any preceding aspect, wherein the container is a water heating tank and the fluid is water.

Aspect 16: The method of any preceding aspect, wherein the heating source is an electrical heating element.

Aspect 17: The method of any preceding aspect, wherein the heating source is a natural gas heating element, a solar heating element, a propane heating element, or an oil heating element.

Aspect 18: The method of any preceding aspect, wherein the temperature sensor is configured to provide an electrical signal indicative of the temperature of the fluid.

Aspect 19: The method of any preceding aspect, wherein receiving the user input comprises receiving the user input from a user device in operative communication with the controller over the remote network.

Aspect 20: The method of any preceding aspect, wherein the first sample rate is at least one of one or more seconds, one or more minutes, and one or more hours.

D. Claims

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A digital temperature control system comprising:
a first means for reading a measurement captured by a temperature sensor configured to measure a temperature of a fluid in a container;
a second means for operating a relay to determine and control a state of a heating source configured to affect the temperature of the fluid in the container;
a communications module for bi-directional communication of data associated with the first and the second means to a remote network;
a processor for processing the communicated data; and
a controller configured to operate the processor, the first means, the second means, and the communications module, the controller being configured to:
receive a user input defining at least one of a first temperature threshold, a second temperature threshold, a first sample rate for operating the first means to retrieve the measurement captured by the temperature sensor, and a second sample rate for operating the second means to determine and control a state of the heating source;
receive, from the communications module, the measurement captured by the temperature sensor in accordance to the first sample rate;
determine, via the second means, the state of the heating source;
compare the user input to the measurement captured by the first means;
configure the second means to operate the heating source in accordance with the comparison of the user input to the measurement captured by the first means, wherein the configuration of the second means includes at least one of:
turn the heating source on when the heating source is off and the measurement is below the first temperature threshold, and
turn the heating source off when the heating source is on and the measurement is above the second temperature threshold;
aggregate the received data associated with the container of the fluid from the communications module, the aggregated data indicative of power consumption associated with the container of the fluid, the energy usage comprising real-time usage data and historical usage data, and costs associated with the power consumption;
predict future power consumption and costs associated with the container of the fluid; and
adjust, based on predicted future power consumption and costs, the first temperature threshold and the second temperature threshold;
wherein the container of the fluid has no built-in communications module for communicating with the remote network.

2. The digital temperature control system of claim 1, wherein predicting the future power consumption and costs comprises:
employing usage analytics; and
employing at least one environmental factor based on a location of the container of the fluid, and times of operation of the heating source.

3. The digital temperature control system of claim 1, wherein the container is a water heating tank and the fluid is water.

4. The digital temperature control system of claim 1, wherein the heating source is an electrical heating element.

5. The digital temperature control system of claim 1, wherein the heating source is a natural gas heating element, a solar heating element, a propane heating element, or an oil heating element.

6. The digital temperature control system of claim 1, wherein the temperature sensor is configured to provide an electrical signal indicative of the temperature of the fluid.

7. The digital temperature control system of claim 1, further comprising a user device in operative communication with the controller over the remote network.

8. The digital temperature control system of claim 1, wherein the first sample rate is at least one of one or more seconds, one or more minutes, and one or more hours.

9. The digital temperature control system of claim 1, wherein the second sample rate is at least one of one or more seconds, one or more minutes, and one or more hours.

10. The digital temperature control system of claim 1, wherein the remote network is a wireless network.

11. The digital temperature control system of claim 1, wherein the first temperature threshold is greater than or equal to ninety degrees Fahrenheit.

12. The digital temperature control system of claim 1, wherein the second temperature threshold is greater than or equal to one hundred fifty degrees Fahrenheit.

13. A method comprising:
integrating a container of a fluid with a digital temperature control means, the digital temperature control means comprising:
a first means for reading a measurement captured by a temperature sensor configured to measure a temperature of the fluid in the container,
a second means for operating a relay to determine and control a state of a heating source configured to affect the temperature of the fluid in the container,
a communications module for bi-directionally communicating data associated with the first and second means with a remote network, a processor for processing the communicated data, and
a controller configured to operate the processor, the first means, the second means, and the communications module;
receiving a user input comprising at least one of the following:
a first temperature threshold,
a second temperature threshold,
a first sample rate for operating the first means to retrieve the measurement captured by the temperature sensor, and
a second sample rate for operating the second means to determine and control a state of the heating source;
receiving, via the first means, the measurement captured by the temperature sensor in accordance to the first sample rate;
determining, via the second means, the state of the heating source;
comparing the user input to the measurement captured by the first means;
configuring the second means to operate the heating source in accordance with the comparison of the user input to the measurement captured by the first means, wherein configuring the second means includes:
turning the heating source on when the heating source is off and the measurement is below the first temperature threshold, and
turning the heating source off when the heating source is on and the measurement is above the second temperature threshold;
aggregating the received data associated with the container of the fluid and operation of the digital temperature control means;
calculating usage analytics, the usage analytics comprising:
power consumption associated with the container of the fluid, the energy usage comprising real-time usage data and historical usage data, and
costs associated with the power consumption;
predicting future power consumption and costs associated with the container of the fluid; and
adjusting, based on predicted future power consumption and costs the first temperature threshold and the second temperature threshold,
wherein integrating the container of the fluid with the digital temperature control means comprises integrating the container of the fluid that has no built-in communications module for communicating with the remote network.

14. The method of claim 13, wherein predicting the future power consumption and costs comprises:
employing the usage analytics; and
employing at least one environmental factor based on a location of the container of the fluid, and times of operation of the heating source.

15. The method of claim 13, wherein the container is a water heating tank and the fluid is water.

16. The method of claim 13, wherein the heating source is an electrical heating element.

17. The method of claim 13, wherein the heating source is a natural gas heating element, a solar heating element, a propane heating element, or an oil heating element.

18. The method of claim 13, wherein the temperature sensor is configured to provide an electrical signal indicative of the temperature of the fluid.

19. The method of claim 13, wherein receiving the user input comprises receiving the user input from a user device in operative communication with the controller over the remote network.

20. The method of claim 13, wherein the first sample rate is at least one of one or more seconds, one or more minutes, and one or more hours.

* * * * *